(12) United States Patent
van Heiningen et al.

(10) Patent No.: US 7,824,521 B2
(45) Date of Patent: Nov. 2, 2010

(54) PROCESS OF TREATING A LIGNOCELLULOSIC MATERIAL WITH HEMICELLULOSE PRE-EXTRACTION AND HEMICELLULOSE ADSORPTION

(75) Inventors: Adriaan Reinhard Pieter van Heiningen, Orono, ME (US); Sung-Hoon Yoon, Auburn, AL (US); Haixuan Zou, Orono, ME (US); Jianer Jiang, Mason, OH (US); Gopal C. Goyal, Mason, OH (US)

(73) Assignees: University of Maine System Board of Trustees, Bangor, ME (US); International Paper Company, Memphis, TN (US)

( * ) Notice: Subject to any disclaimer, the term of this patent is extended or adjusted under 35 U.S.C. 154(b) by 127 days.

(21) Appl. No.: 11/640,820

(22) Filed: Dec. 18, 2006

(65) Prior Publication Data

US 2008/0142176 A1 Jun. 19, 2008

(51) Int. Cl.
*D21C 3/22* (2006.01)
*D21C 3/02* (2006.01)

(52) U.S. Cl. .................. 162/43; 162/9; 162/17; 162/41

(58) Field of Classification Search .................. 162/9
See application file for complete search history.

(56) References Cited

U.S. PATENT DOCUMENTS

| 2,904,460 | A | * | 9/1959 | Nolan | 162/25 |
| 3,354,029 | A | * | 11/1967 | Ronnie et al. | 162/41 |
| 4,127,439 | A | * | 11/1978 | Fujii et al. | 162/40 |
| 4,436,586 | A | | 3/1984 | Elmore | |
| 4,561,936 | A | | 12/1985 | Samuelson | |
| 4,661,205 | A | | 4/1987 | Ow et al. | |
| 4,908,098 | A | | 3/1990 | DeLong et al. | |
| 5,032,224 | A | | 7/1991 | Ahluwalia | |
| 5,041,192 | A | | 8/1991 | Sunol et al. | |

(Continued)

OTHER PUBLICATIONS

Van Heiningen, Hemicellulose Extraction and Its Integration in Pulp Production (Part of the Quarterly Forest Products Industry of The Future Quarterly status report for Q1 05) [downloaded from www.p2pays.org], quarterly report available Jun. 22, 2005 [downloaded online Oct. 6, 2008], Department of Energy: EERE, p. 53-63.*

(Continued)

*Primary Examiner*—Eric Hug
*Assistant Examiner*—Anthony J Calandra
(74) *Attorney, Agent, or Firm*—MacMillan, Sobanski & Todd, LLC

(57) ABSTRACT

A process of treating a lignocellulosic material includes a pre-extraction step in which hemicellulose is extracted from the lignocellulosic material. In one embodiment, the pre-extraction step involves contacting the lignocellulosic material with an aqueous solution under conditions that release acidic material from the lignocellulosic material into the aqueous solution, and the aqueous solution includes a basic material that at least partly neutralizes the acidic material so that the aqueous solution at the end of the pre-extraction step has a pH within a range of from 4.5 to 11. The process also includes a pulping step, after the pre-extraction step, in which the lignocellulosic material is separated into pulp. The process further includes an adsorption step, after the pulping step, in which hemicellulose is adsorbed on the pulp.

14 Claims, 11 Drawing Sheets

Pre-Extraction/Alkaline Cooking/Adsorption Block Diagram

U.S. PATENT DOCUMENTS

| | | | |
|---|---|---|---|
| 5,074,960 A | | 12/1991 | Nimz et al. |
| 5,217,574 A | | 6/1993 | Griggs |
| 5,250,152 A | * | 10/1993 | Ling et al. .................... 162/72 |
| 5,424,417 A | | 6/1995 | Torget et al. |
| 5,503,996 A | | 4/1996 | Torget et al. |
| 5,529,663 A | | 6/1996 | Springer |
| 5,589,033 A | | 12/1996 | Tikka et al. |
| 5,705,369 A | | 1/1998 | Torget et al. |
| 5,788,812 A | | 8/1998 | Agar et al. |
| 6,413,367 B1 | | 7/2002 | Svedman et al. |
| 6,419,788 B1 | | 7/2002 | Wingerson |
| 6,464,827 B1 | * | 10/2002 | Colodette .................... 162/63 |
| 2004/0200587 A1 | | 10/2004 | Herring et al. |
| 2004/0200589 A1 | | 10/2004 | Herring et al. |
| 2004/0244925 A1 | | 12/2004 | Tarasenko |
| 2006/0225852 A1 | * | 10/2006 | Pekarovic et al. ............. 162/29 |
| 2007/0079944 A1 | | 4/2007 | Amidon et al. |
| 2007/0284068 A1 | * | 12/2007 | Francis et al. ................. 162/17 |

OTHER PUBLICATIONS

Violette et al., Selectivity Improvement during Oxygen Delignification by Adsorption of Polymeric Additives, 2002, TAPPI Int Pulp Bleaching Conference, whole document.*

Van Heiningen, Integrated Forest Products Refinery,1997, DOE:EERE, p. 24-36.*

Ban et al., Insight into the Chemical Behavior of Softwood Carbohydrates during High-Sulfidity Green Liquor Pretreatment, 2004, Ind. Eng. Chem. Res, 43, 1366-1372.*

Singh et al., Green Liquor Pretreatment as a Feasible Method for the Enhancement of Softwood Pulp Chemical Properties, Oct. 2000, IPST Technical Paper Series, No. 886, whole document.*

* cited by examiner

Pre-Extraction/Alkaline Cooking/Adsorption Block Diagram

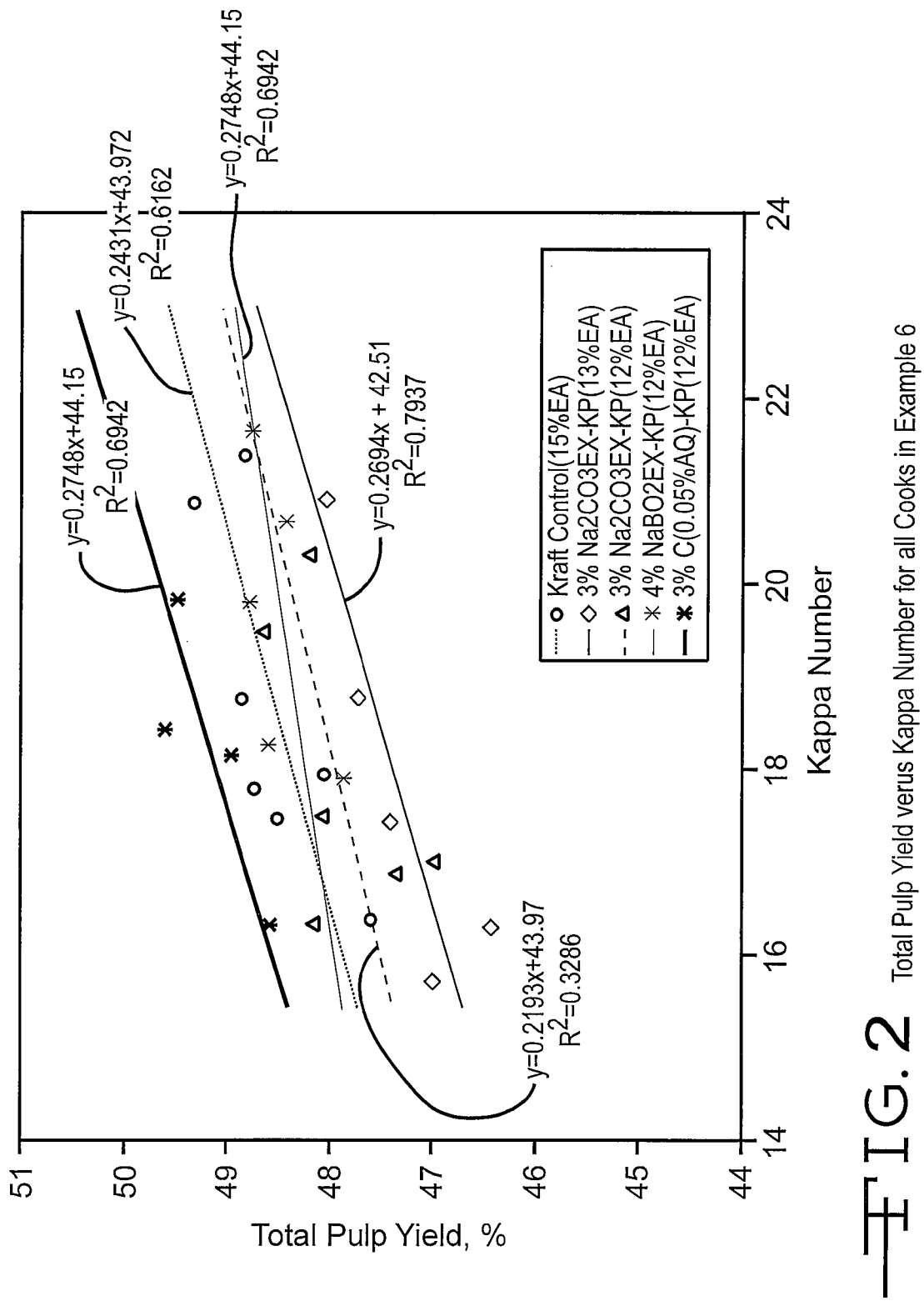
FIG. 2  Total Pulp Yield versus Kappa Number for all Cooks in Example 6

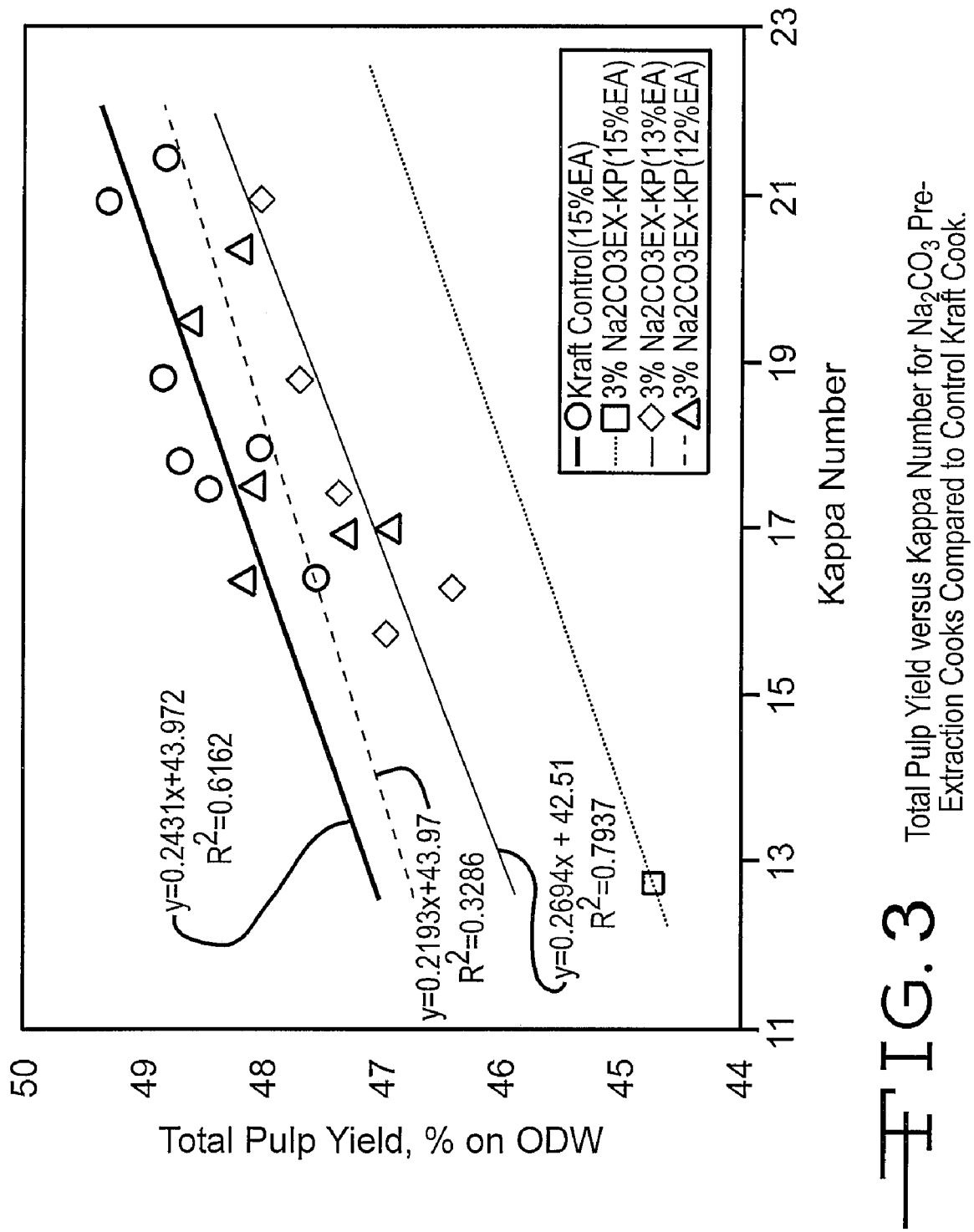
FIG. 3  Total Pulp Yield versus Kappa Number for $Na_2CO_3$ Pre-Extraction Cooks Compared to Control Kraft Cook.

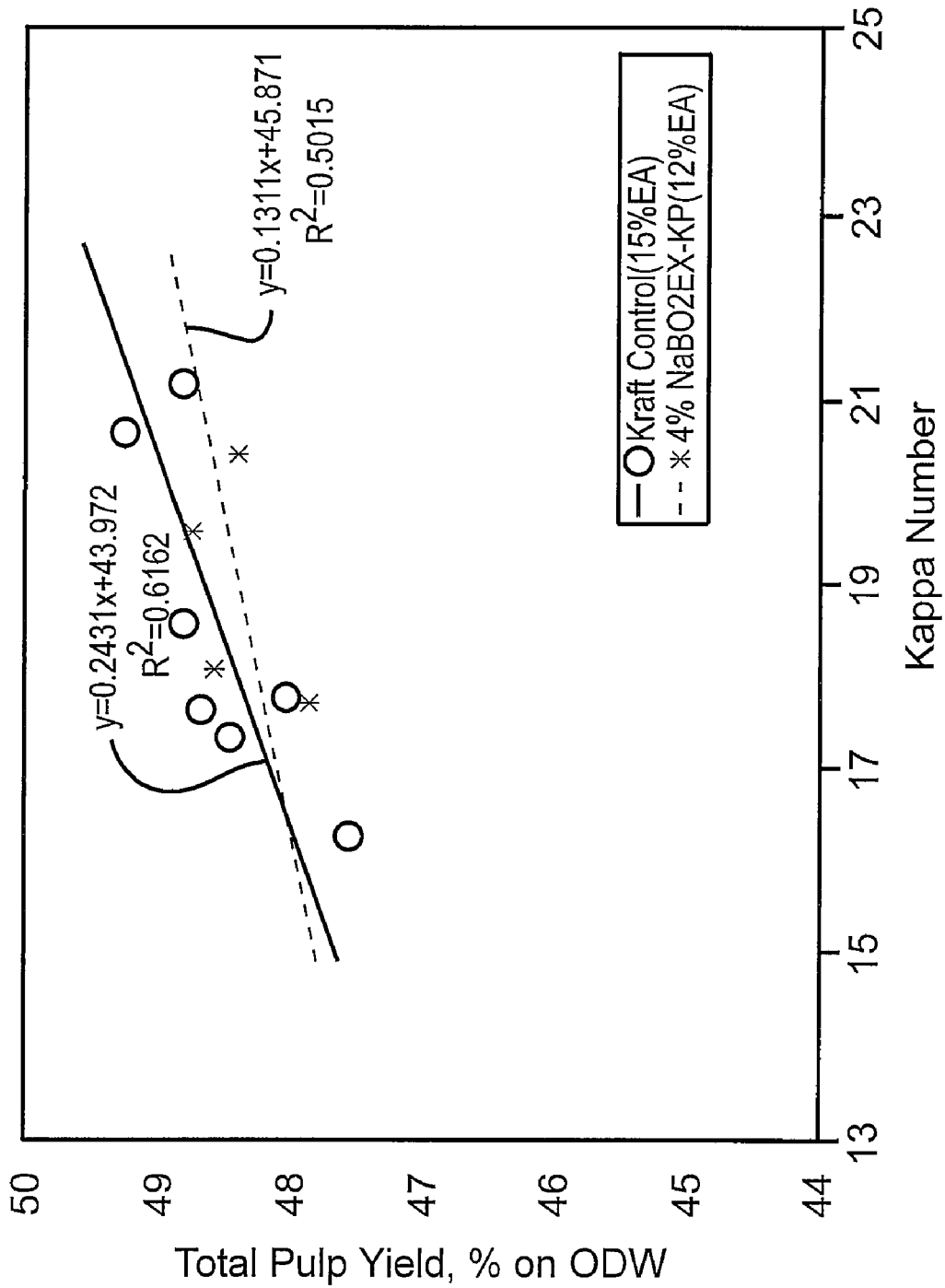
FIG. 4  Total Pulp Yield versus Kappa Number for $NaBO_2$ Pre-Extraction Cooks Compared to Control Kraft Cook.

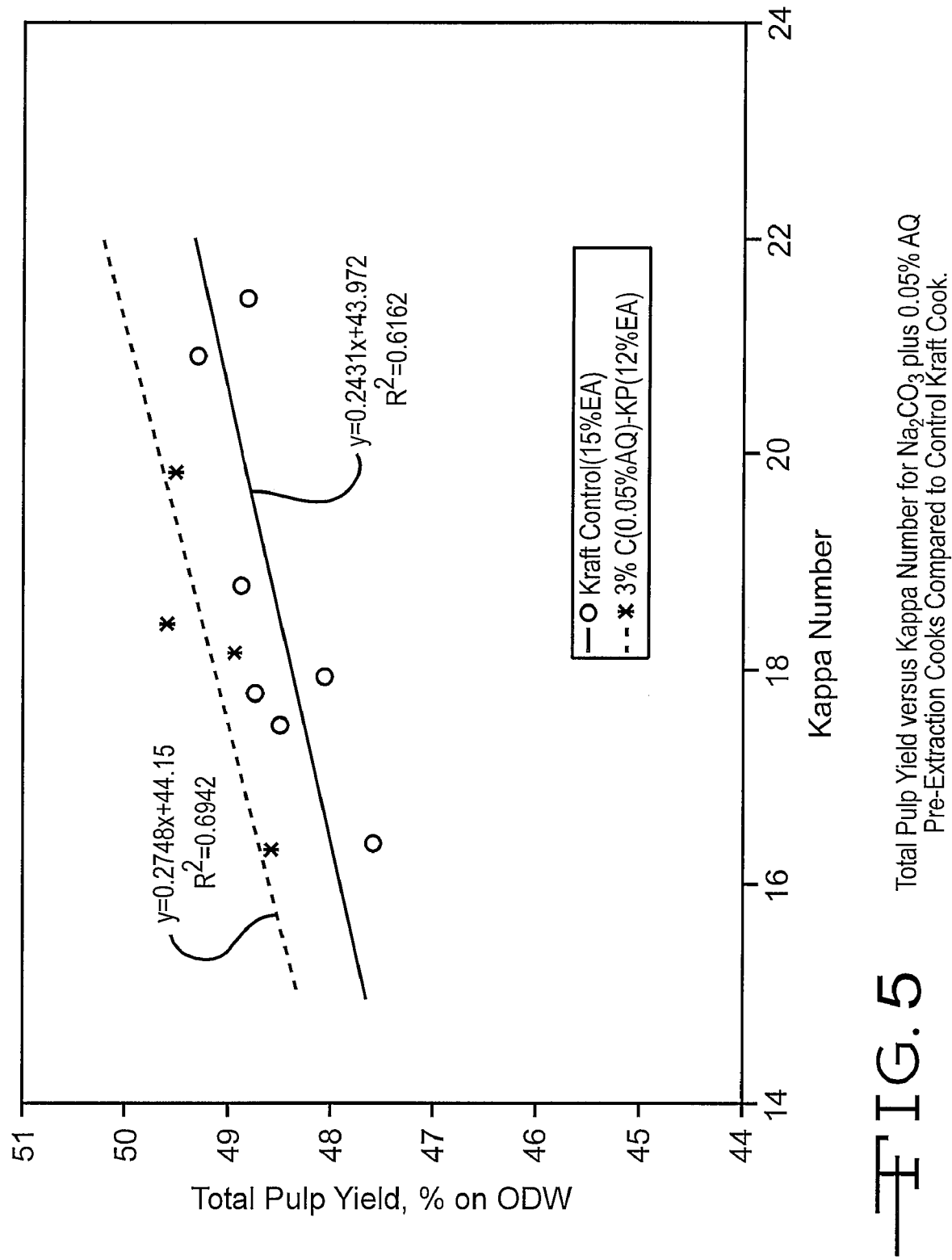
FIG. 5  Total Pulp Yield versus Kappa Number for Na$_2$CO$_3$ plus 0.05% AQ Pre-Extraction Cooks Compared to Control Kraft Cook.

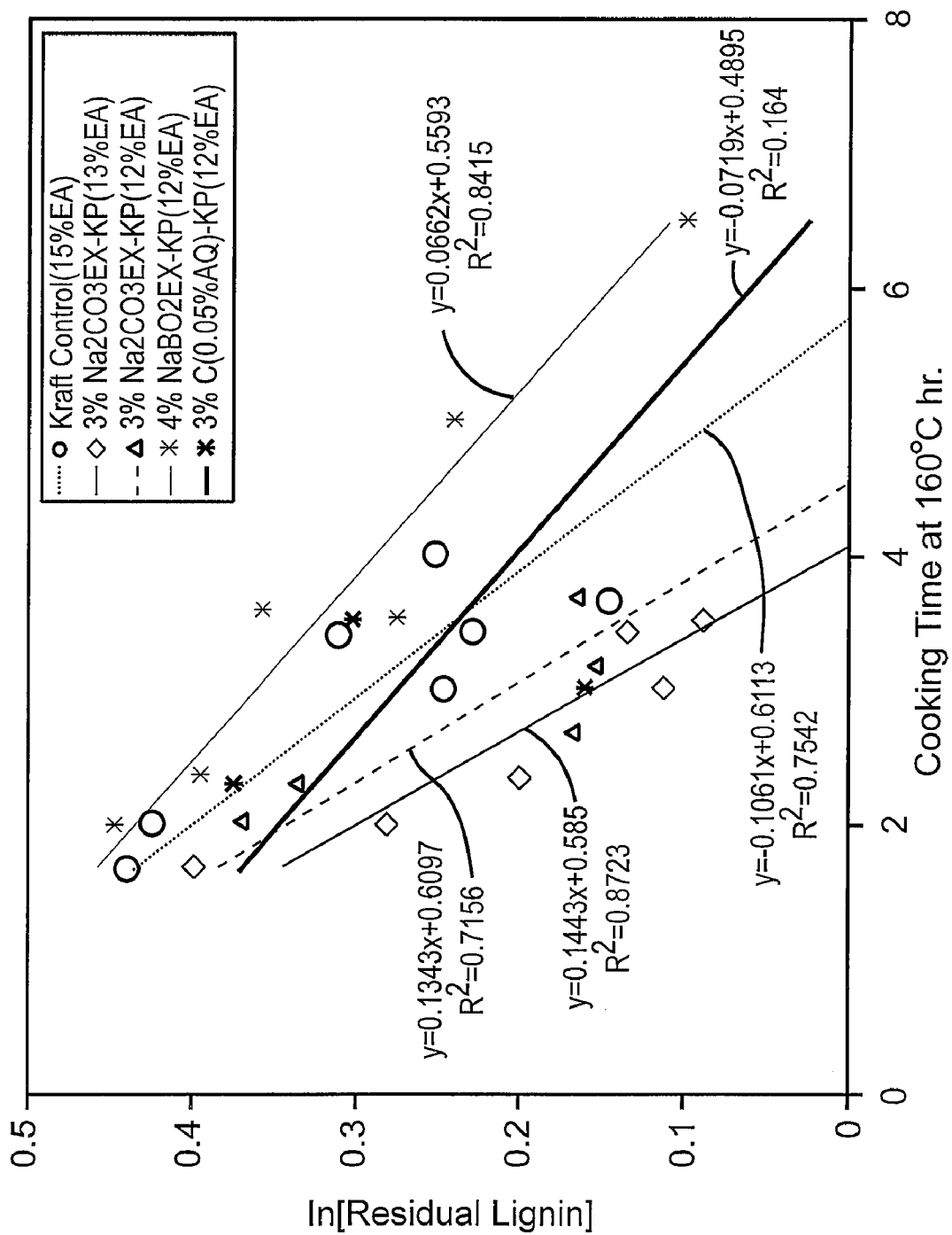
FIG. 6 Kraft Delignification Rate for All Cooks in Examle 6.

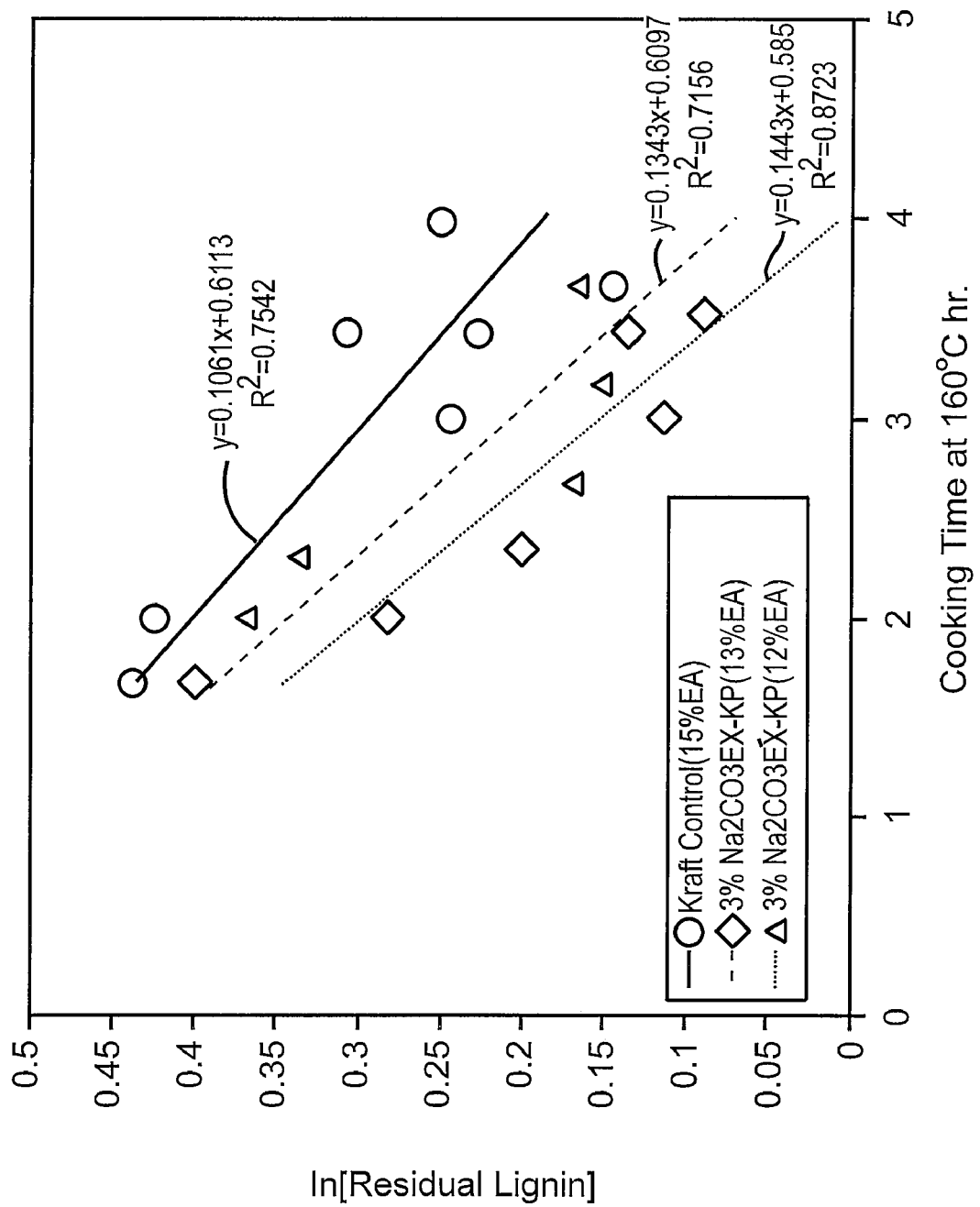
FIG. 7 Kraft Delignification Rate for Na₂CO₃ Extraction/Kraft and Control Cooks.

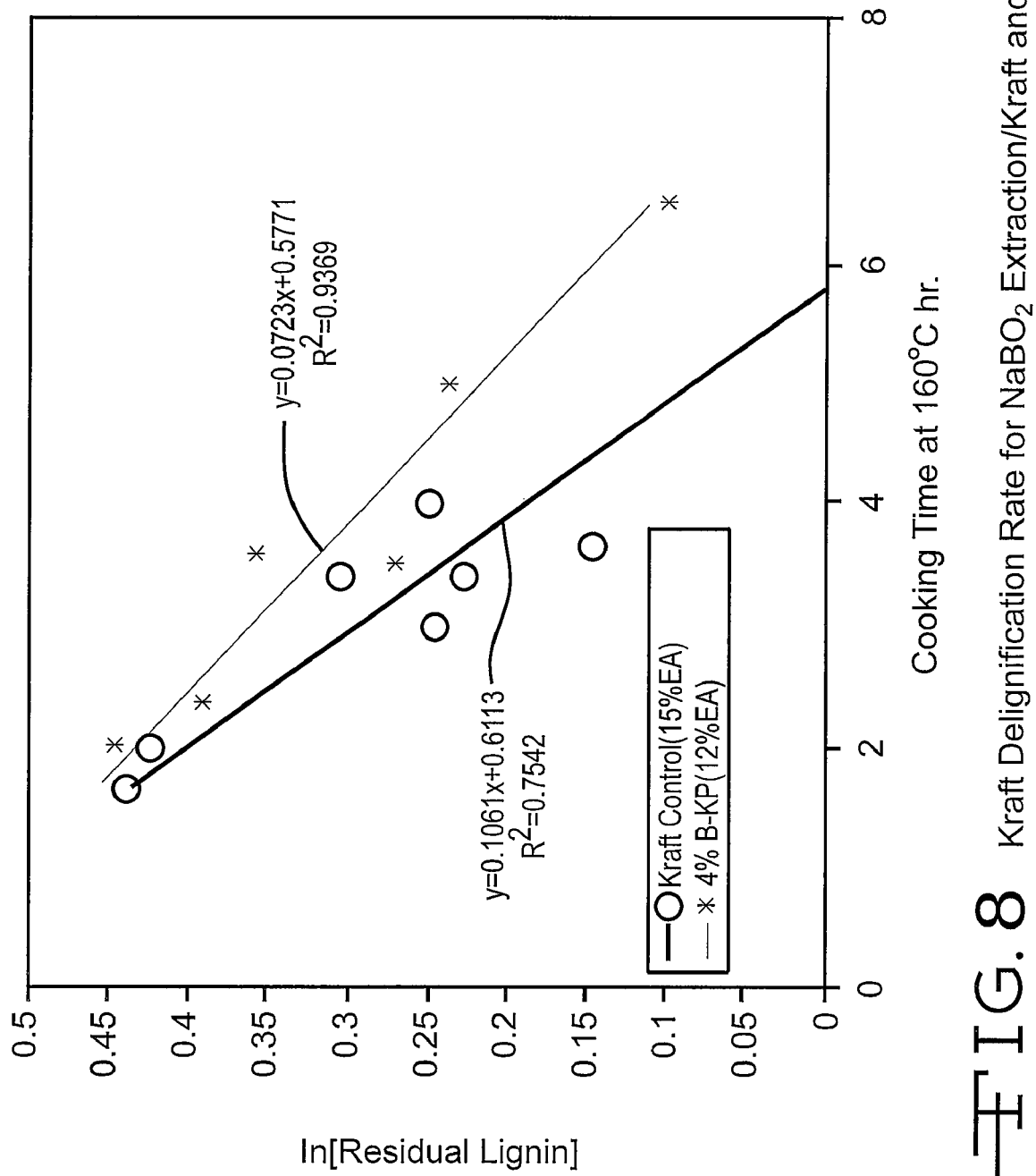
FIG. 8 Kraft Delignification Rate for NaBO₂ Extraction/Kraft and Control Cooks.

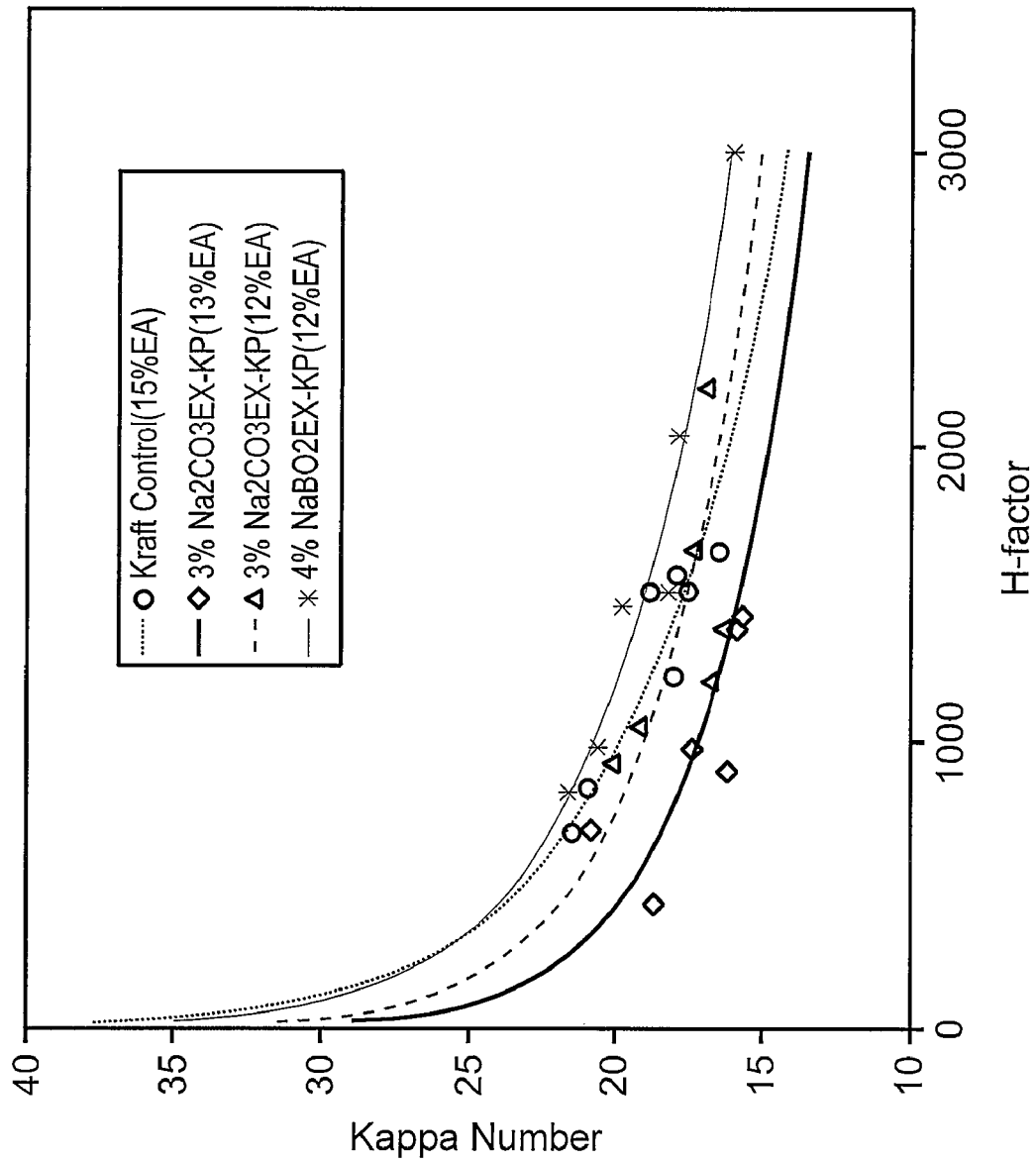
FIG. 9   Kappa Number versus H-factor for $Na_2CO_3$ and $NaBO_2$ Pre-Extraction/Kraft Cooks.

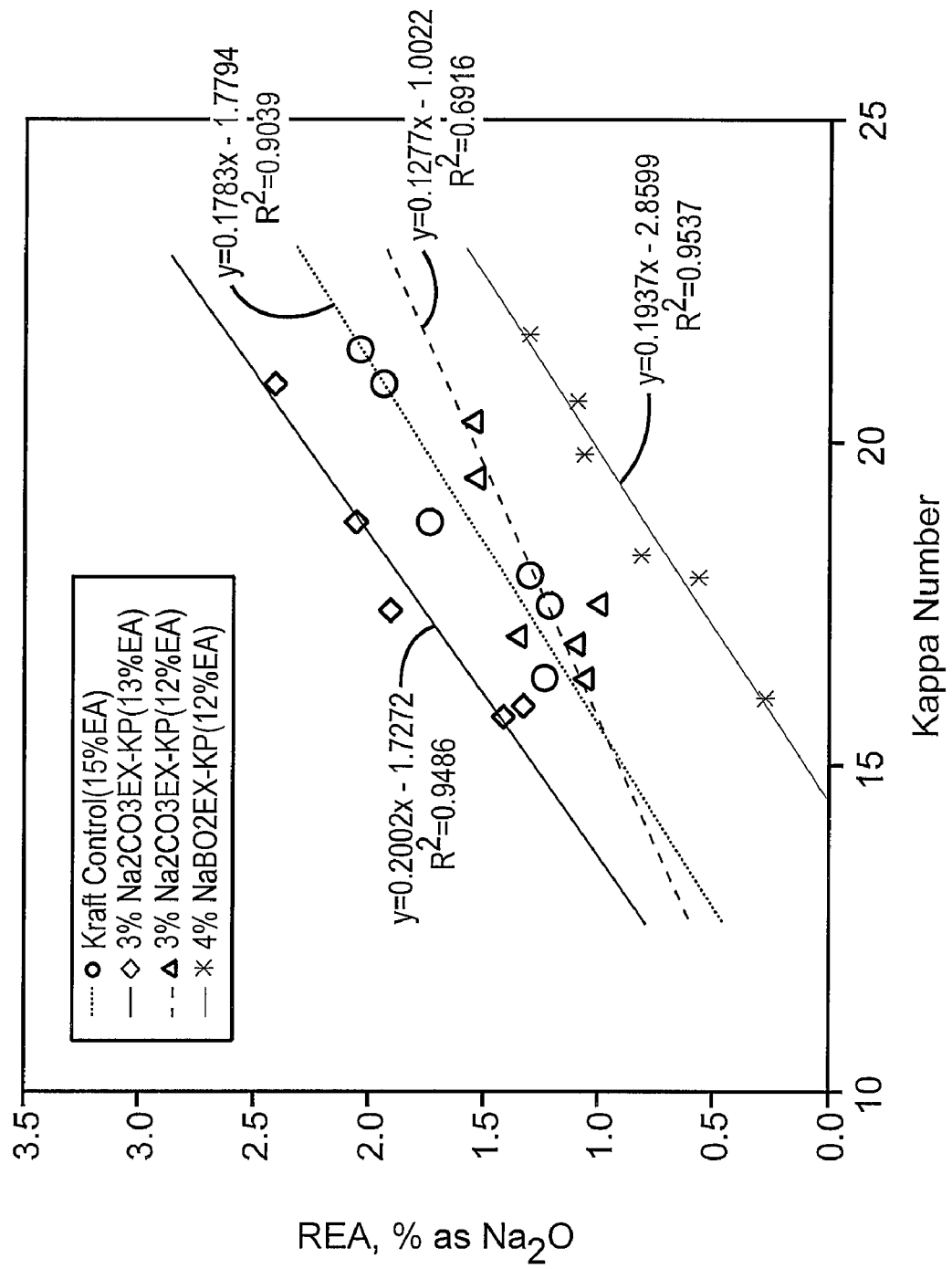
FIG. 10 Residual Effective Alkali at the End of the Kraft Cook for $Na_2CO_3$ and $NaBO_2$ pre-Extraction/Kraft Cooks.

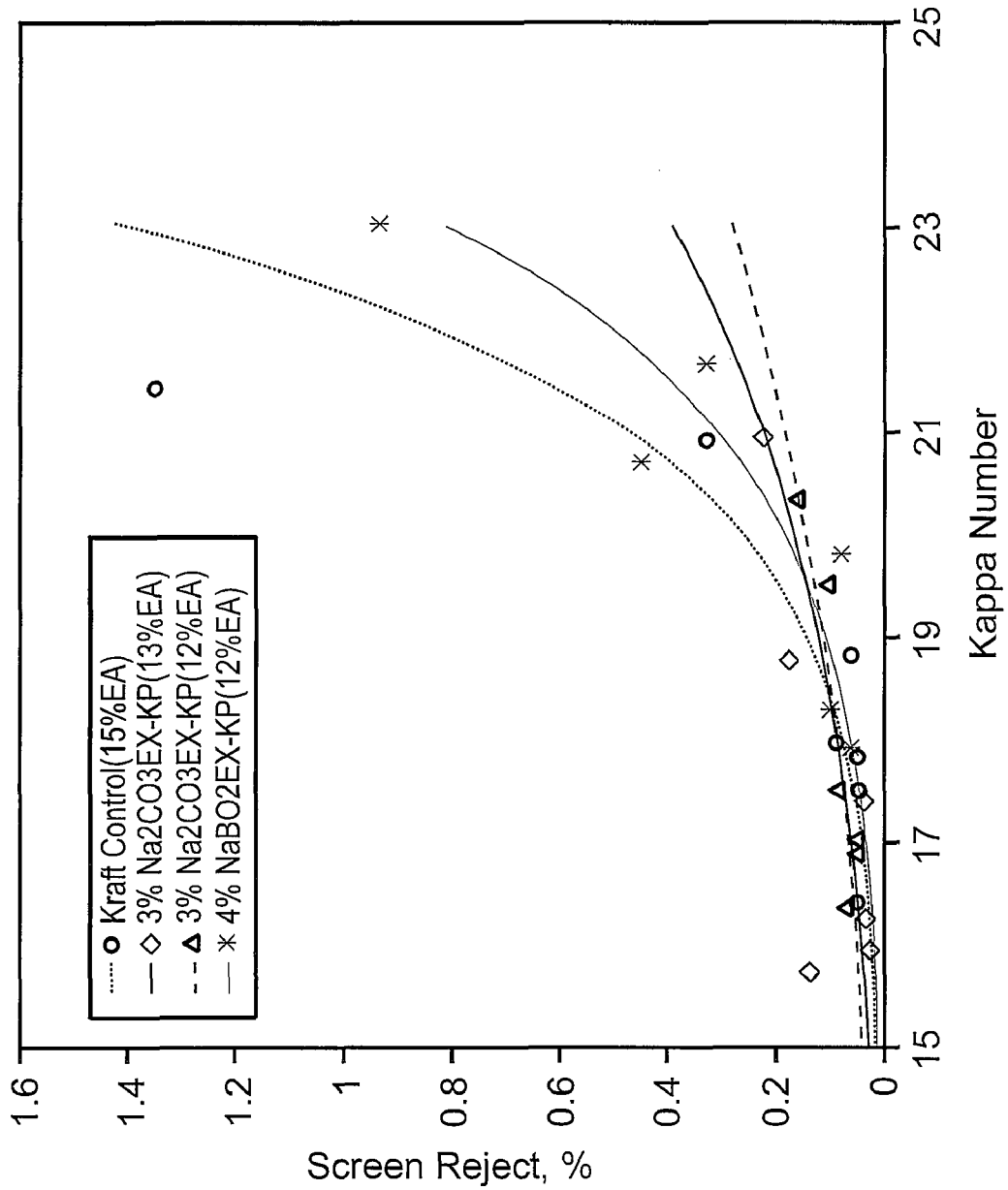
FIG. 11  Screen Rejects versus Kappa Number for $Na_2CO_3$ and $NaBO_2$ Pre-Extraction/Kraft Cooks.

PROCESS OF TREATING A LIGNOCELLULOSIC MATERIAL WITH HEMICELLULOSE PRE-EXTRACTION AND HEMICELLULOSE ADSORPTION

BACKGROUND OF THE INVENTION

This invention relates in general to processes of treating lignocellulosic materials and in particular to a process of producing a lignocellulosic pulp such as a wood pulp.

Lignocellulosic materials, such as wood, are plant materials made up primarily of cellulose, hemicellulose and lignin. The cellulose is the chief structural element and major constituent of the plants. It consists of a fibrous cellulose portion made from polymeric chains that are aligned with one another and form strong associated bonds with adjacent chains. The lignin is a three-dimensional polymeric material that bonds the cellulosic fibers and is also distributed within the fibers themselves. Lignin is largely responsible for the strength and rigidity of the plants. The hemicellulose is a polysaccharide that is a component of the cell walls of the plants. The two major classes of hemicellulose are glucomannans and xylans.

The wood is converted to pulp for use in paper manufacturing. Pulp comprises wood fibers capable of being slurried or suspended and then deposited on a screen to form a sheet of paper. There are two main types of pulping techniques: mechanical pulping and chemical pulping. In mechanical pulping, the wood is physically separated into individual fibers. In chemical pulping, the wood chips are digested with chemical solutions to solubilize portions of the lignin and hemicellulose and thus permit their removal in the waste pulping liquor. The commonly used chemical pulping processes include the kraft process, the sulfite process, and the soda process. The kraft process is the most commonly used and involves digesting the wood chips in an aqueous solution of sodium hydroxide and sodium sulfide. The wood pulp produced in the pulping process is usually separated into a fibrous mass and washed.

The wood pulp after the pulping process is dark colored because it contains residual lignin not removed during digestion which has been chemically modified in pulping to form chromophoric groups. In order to lighten the color of the pulp, so as to make it suitable for white paper manufacture, it is necessary to remove the residual lignin by use of delignifying materials and by chemically converting any residual lignin into colorless compounds by bleaching. Delignification and bleaching of wood pulp have been carried out with materials such as chlorine, oxygen or ozone.

U.S. Pat. No. 4,436,586 by Elmore discloses a method for producing both kraft pulp and alcohol from hardwood chips or the like. The chips are subjected to mild acid prehydrolysis following by mild caustic pre-extraction. The withdrawn hydrolysate has insufficient furfural to inhibit microorganism growth, and both the hexose and pentose sugars in the hydrolysate are fermented to ultimately produce ethanol, butanol, or the like. The chips, after caustic pre-extraction, are subjected to a sulphate cook, and a wash, and the resultant pulp is a kraft pulp said to have viscosity and tear strength characteristics more desirable than conventional kraft pulp. The pulp can be subjected to oxygen delignification, and it can achieve a higher K number in fewer subsequent bleaching stages than conventional kraft pulp.

SUMMARY OF THE INVENTION

This invention relates to a process of treating a lignocellulosic material. The process includes a pre-extraction step in which hemicellulose is extracted from the lignocellulosic material. In one embodiment, the pre-extraction step comprises contacting the lignocellulosic material with an aqueous solution under conditions that release acidic material from the lignocellulosic material into the aqueous solution, and the aqueous solution includes a basic material that at least partly neutralizes the acidic material so that the aqueous solution at the end of the pre-extraction step has a pH within a range of from about 4.5 to about 11. The process also includes a pulping step, after the pre-extraction step, in which the lignocellulosic material is separated into pulp. The process further includes an adsorption step, after the pulping step, in which hemicellulose is adsorbed on the pulp.

In another embodiment, the process includes a pre-extraction step in which hemicellulose is extracted from the lignocellulosic material by contacting the lignocellulosic material with an aqueous solution under conditions that release acidic material from the lignocellulosic material into the aqueous solution, and the aqueous solution includes a basic material that at least partly neutralizes the acidic material so that the aqueous solution at the end of the pre-extraction step has a pH within a range of from about 4.5 to about 11. The process also includes a pulping step, after the pre-extraction step, in which the lignocellulosic material is separated into pulp. Further, the process excludes the use of an acid hydrolysis step before the pulping step.

In another embodiment, the process comprises providing a pulp from a lignocellulosic material, and adsorbing hemicellulose on the pulp to increase the yield of the pulp.

In a further embodiment, the process comprises providing a pulp from a lignocellulosic material, then adsorbing hemicellulose on the pulp, and then subjecting the pulp to a delignification process to remove lignin from the pulp. The adsorbed hemicellulose increases the selectivity of the delignification process compared to the same process without the adsorbed hemicellulose.

Various advantages of this invention will become apparent to those skilled in the art from the following detailed description of the preferred embodiments, when read in light of the accompanying figures.

BRIEF DESCRIPTION OF THE DRAWINGS

FIGS. 2-11 are graphs displaying the result of processes described in Example 6. In particular, FIG. 2 shows that the total pulp yield versus kappa number relationship for pre-extraction/kraft cooks runs parallel to that of the kraft control cooks over a range of bleachable pulp kappa numbers.

FIG. 3 shows the effect of effective alkali (EA) charge during a kraft cook on the total pulp yield for $Na_2CO_3$ pre-extraction/kraft cooks as compared to that of a control kraft cook at 15% EA charge.

FIG. 4 shows that at the same kappa number the total pulp yield after pre-extraction with 4% $NaBO_2$ followed by kraft cooking at 12% EA charge is about 0 to 0.5% lower than that of the control kraft cook at 15% EA charge.

FIG. 5 shows that at the same kappa number the total pulp yield after extraction with $Na_2CO_3$ plus 0.05% AQ followed by kraft cooking at 12% EA charge is almost 1% higher than that of the control kraft cook at 15% EA charge.

FIG. 6 shows that the delignification rate for the $Na_2CO_3$ pre-extraction/kraft cooks is higher than that of the control kraft cook, while that of the $NaBO_2$ pre-extraction/kraft cook is lower than that of the control kraft cook.

FIG. 7 shows the effect of the EA charge during the kraft cook of the $Na_2CO_3$ pre-extraction/kraft cooks.

FIG. 8 shows the slower delignification rate of the $NaBO_2$ pre-extraction/kraft cook relative to the control kraft cook.

FIG. 9 shows the effect of these delignification rates on the development of the kappa number versus the H-factor.

FIG. 10 shows that the $Na_2CO_3$ extraction/kraft cooks at 13% EA charge produce a black liquor of about 0.5% higher residual effective alkali (REA) than that of the kraft control cooks with 15% EA charge at the same final kappa number, while there is little difference in REA between the control kraft cook and the $Na_2CO_3$ extraction/kraft cook at 12% EA.

FIG. 11 shows the percentage of screen rejects versus kappa number for the $Na_2CO_3$ and $NaBO_2$ pre-extraction/kraft cooks.

DETAILED DESCRIPTION OF THE PREFERRED EMBODIMENT

Figure 1:
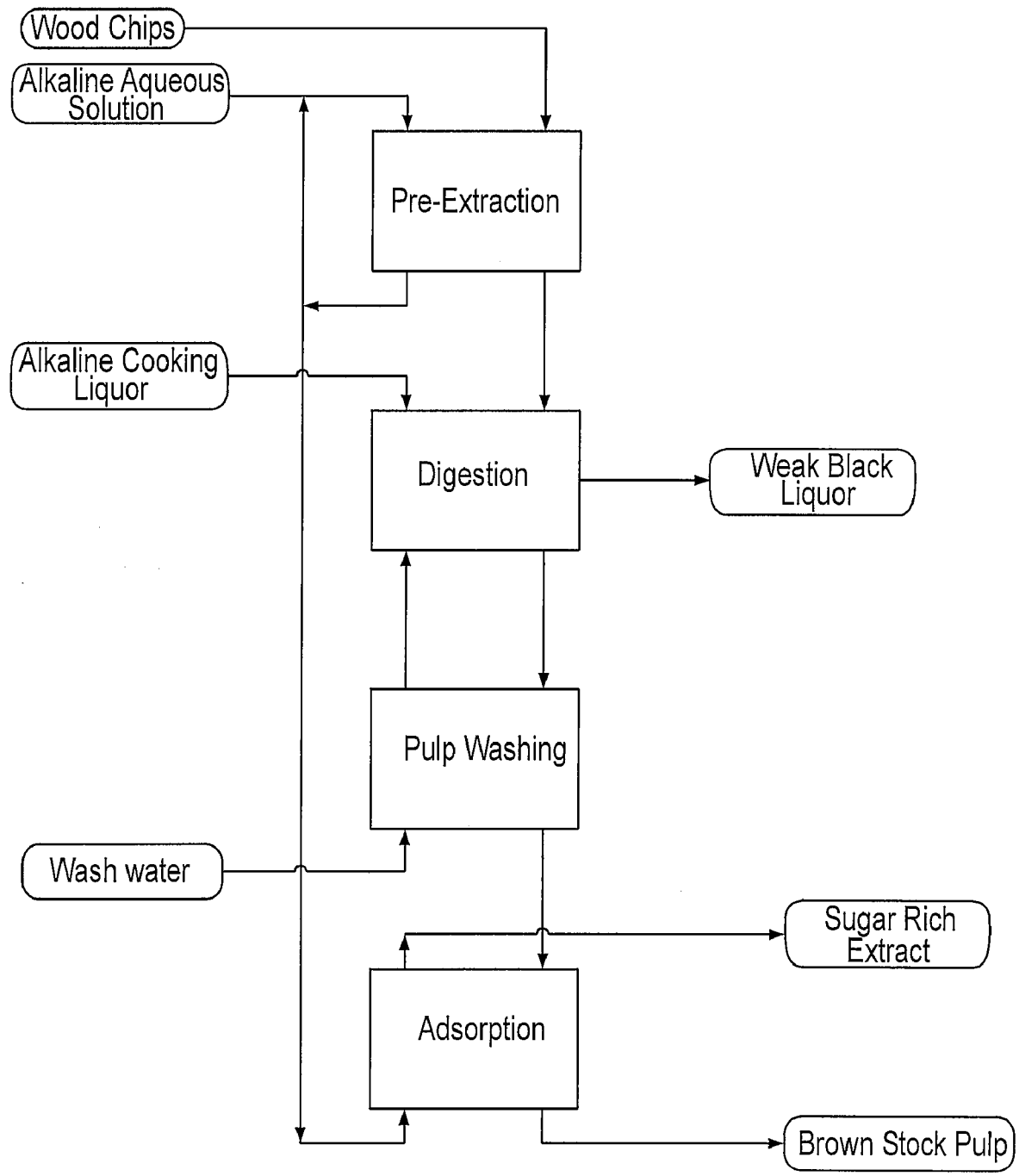
FIG. 1 is a block diagram of a process of treating a wood chips to produce pulp, the process including pre-extraction and adsorption steps.

The lignocellulosic material which is treated in the process of the invention can be any plant material made up primarily of cellulose, hemicellulose and lignin. In some embodiments the lignocellulosic material is wood, such as hardwood or softwood. The lignocellulosic material can be in any suitable form at the start of the process. In some embodiments the lignocellulosic material is in a comminuted form, for example in the form of wood chips. FIG. 1 is a block diagram of a process according to one embodiment of the invention. It is seen that the process starts with wood chips.

In the embodiment shown in FIG. 1, the wood chips are subjected to a pre-extraction step of the process. Conventional wood pulping processes do not include such a pre-extraction step. In the pre-extraction step, hemicellulose is extracted from the wood chips. In some embodiments, the pre-extraction step achieves the extraction of at least about 4%, at least about 10%, or at least about 15% of the hemicellulose from the lignocellulosic material as measured on a dry material weight basis (an oven dry wood weight basis in the illustrated embodiment).

The hemicellulose extraction can be accomplished in any suitable manner. In one embodiment, the hemicellulose is extracted by contacting the lignocellulosic material with an aqueous solution that includes a basic material such as an alkali material. Any suitable basic material can be used in the pre-extraction step. Some nonlimiting examples include alkali metal hydroxides, alkali metal borates, alkali metal carbonates, and mixtures thereof.

Optionally, the aqueous solution can also include an additive that benefits the process by one or both of the following: improving extraction of the hemicellulose from the lignocellulosic material during the pre-extraction step, or improving separation of the lignocellulosic material into pulp during the pulping step (described below). Any suitable additive can be used, for example, an additive selected from anthraquinones, anthraquinone derivatives, or mixtures thereof.

The pre-extraction step can be conducted using any suitable process equipment and conditions. In one embodiment, the lignocellulosic material is soaked in the aqueous solution such that it becomes impregnated with the solution, and the temperature of the solution is raised and held at an elevated temperature for a suitable time to reach the desired pH. In some embodiments the conditions of the pre-extraction step include a temperature of extraction as for example within a range of from about 110° C. to about 180° C., e.g. from 130° C. to about 170° C., or from about 135° C. to about 165° C., and a time of extraction within a range of from about 30 minutes to about 150 minutes, e.g., from about 45 minutes to about 120 minutes.

Contacting the lignocellulosic material with the aqueous solution during the pre-extraction step may cause acidic material(s) to be released from the lignocellulosic material into the solution. For example, such acidic materials may include wood sugars and to a lesser extent lignin. The wood sugars include the extracted hemicellulose and other sugars. In one embodiment, the aqueous solution at the beginning of the pre-extraction step is sufficiently basic to at least partly neutralize the acidic material(s) released during the extraction, so that the aqueous solution at the end of the pre-extraction step has a pH within a range of from about 4.5 to about 11.0, e.g. from about 5 to about 10 or from about 5 to about 9.5, when measured at a temperature of 20° C. In a particular embodiment, the aqueous solution at the end of the pre-extraction step is a near-neutral solution having a pH within a range of from about 6 to about 8.

The process may further include a solution removal step, following the pre-extraction step, in which at least part of the aqueous solution including extracted hemicellulose is removed from the lignocellulosic material. In one embodiment at least about 60 wt %, e.g., at least about 75 wt %, of the aqueous solution is removed from the lignocellulosic material. The solution can be removed/withdrawn in any suitable manner.

In one embodiment, at least part of the aqueous solution removed from the lignocellulosic material is recycled by adding it to the aqueous solution at the beginning of the pre-extraction step. The process shown in FIG. 1 includes recycling of part of the removed aqueous solution. The recycling reduces the water concentration and increases the dissolved solids (e.g., sugar) concentration in the aqueous solution.

The process of the invention includes a pulping step in some embodiments. The pulping step follows the pre-extraction step and solution removal. In the pulping step, the lignocellulosic material is separated into pulp, e.g., into wood pulp when wood is used as the starting material. Any suitable chemical or mechanical pulping process can be used in the invention. In some embodiments, the pulping step uses a chemical pulping process such as a kraft process, a sulfite process or a soda process. In the embodiment shown in FIG. 1, the process includes a kraft pulping process (the block labeled "digestion") in which the lignocellulosic material is cooked with an alkaline cooking liquor to allow the wood chips to separate into pulp fibers without much mechanical action. Any suitable effective alkali charge can be used during the kraft process, such as an effective alkali charge within a range of from about 10 to about 20.

The process including the pre-extraction step in combination with the pulping step may result in a pulp yield similar to that of pulping alone. In addition, the recovery of the spent cooking liquor may be reduced compared to that of pulping alone. In one embodiment, the cooking time of the pulping step may be reduced compared to a process that includes the same pulping step without the pre-extraction step. Further, in one embodiment, the effective alkali charge during the pulping step may be reduced compared to a process that includes the same pulping step without the pre-extraction step.

As shown in FIG. 1, the pulp may be washed following the pulping step (digestion). Any suitable pulp washing method can be used, such as contacting the pulp with a wash water to remove impurities and remaining alkaline solution from the pulp.

One embodiment of the invention comprises the above-described combination of pulping step and pre-extraction step. Unlike the process described in U.S. Pat. No. 4,436,586, this embodiment excludes the use of an acid hydrolysis step before the pulping step.

In other embodiments of the invention, the process further includes an adsorption step in which hemicellulose is adsorbed on the pulp. FIG. 1 shows an adsorption step following the pulp washing step. In the illustrated embodiment, part of the aqueous solution containing the extracted hemicellulose from the pre-extraction step bypasses the pulping step and pulp washing and is combined with the pulp in the adsorption step. The term "adsorbed", as used herein, includes any mechanism by which the hemicellulose is combined with the pulp, such as adsorption, absorption, impregnation, or the like. The hemicellulose can be adsorbed on the pulp in any suitable manner. For example, the washed pulp can be contacted with the aqueous solution from the pre-extraction step to adsorb a portion of the dissolved wood sugars including hemicellulose onto the pulp fibers. Alternatively, the hemicellulose adsorbed on the pulp in the adsorption step could be derived from another source.

In some embodiments of the invention, adsorption times are equal to or greater than 5 minutes e.g. from about 5 to about 100 minutes, from about 10 to about 60 minutes, or from about 15 to about 30 minutes, and pulp consistency is from about 1% to about 15% e.g. from about 2% to about 12% or from about 3% to about 10%. In some embodiments of this invention, adsorption pH is 7 or greater e.g. from about 7 to about 14, from about 9 to about 11 or from 10 to about 11 and adsorption temperature is within a range of from about room temperature to about 150° C. e.g. from 50° C. to about 120° C. or from about 65° C. to about 100° C. The adsorption of the hemicellulose and other sugars on the pulp increases the pulp yield. In one embodiment, the pulp yield at the end of the adsorption step is higher than the pulp yield of a process that includes the same pulping step without the pre-extraction and adsorption steps. For example, the pulp yield may be increased by at least about 1%, or by at least about 3%, on a dry material weight basis.

One embodiment of the invention comprises: providing a pulp from a lignocellulosic material, and adsorbing hemicellulose on the pulp to increase the yield of the pulp. The pulp and the hemicellulose may be derived from any source, such as from the above-described processes or from other sources. Also, other sugars in addition to hemicellulose may be adsorbed. The adsorption step may be conducted at any time in relation to any delignification and/or bleaching of the pulp (described below); in some embodiments the adsorption is prior to delignification and/or bleaching.

As shown in FIG. 1, the pulp at the end of the adsorption step may be referred to as a brown stock pulp. Additionally, the process of the invention may result in a sugar rich extract following the adsorption step, which is the aqueous solution including any hemicellulose and other sugars that are not adsorbed on the pulp during the adsorption step. This sugar rich extract is a feed stream which is available for the production of value-added materials.

Optionally, the process can also include subjecting the brown stock pulp to delignification and/or bleaching to lighten the color of the pulp. For example, a lighter colored pulp is desirable for applications such as paper making. The delignification and/or bleaching can be conducted at any time in relation to the adsorption step. Any suitable process(es) can be used, such as delignification and bleaching of the pulp with elemental chlorine, with oxygen, or with ozone.

In another embodiment of the invention, the pulp is subjected to a delignification process to remove lignin from the pulp, and the process results in increased selectivity of the delignification process. The first step of the process is providing a pulp from a lignocellulosic material. The pulp can be provided from any suitable source. In one embodiment, the pulp is provided by subjecting the lignocellulosic material to a pulping process, and the process includes an additional step of pre-extracting hemicellulose from the lignocellulosic material before the pulping process.

The next step of the process is adsorbing hemicellulose on the pulp. The hemicellulose can be obtained from a pre-extraction process as described above or it can be obtained from a different source.

Lastly, the pulp is subjected to a delignification process to remove lignin from the pulp. Any suitable delignification process can be used, such as any of those described above. In one embodiment, an oxygen delignification process is used.

Advantageously, the adsorbed hemicellulose increases the selectivity of the delignification process compared to the same process without the adsorbed hemicellulose. For example, the selectivity may be increased by at least about 0.10% or 20%. The selectivity can be defined in any suitable manner. For example, the selectivity can be defined as $\Delta K/\Delta V$, where $\Delta K$ is the change in kappa number that measures delignification and $\Delta V$ is the change in viscosity that characterizes carbohydrate depolymerization.

Trials Supporting the Invention

The following trials describe the conditions and results of the control cooks (i.e. only alkaline cooking and washing, or extraction with pure water rather than an alkaline aqueous solution) and those supporting the invention. In all cases mixed southern hardwood chips supplied by International Paper were used. Example 1 describes the control cook using kraft pulping. It shows that the control kraft cook results in a total yield of 46.57%, rejects of 0.072%, 16 kappa and 40.6 cP viscosity. Example 2 describes the results when the chips are pre-extracted with pure water, and then further treated as described in the block diagram in FIG. 1. The pre-extraction time and temperature are variables in this example. It shows that with pure water extraction, it is not possible to extract a significant amount of hemicelluloses from the wood without causing a sizable loss in yield (about 6-8%) for the final kraft pulp. In Examples 3-5 the extraction is performed with solutions containing respectively NaOH, $Na_2CO_3$ and $NaBO_2$ (sodium meta borate) as alkali source to produce a near neutral extract. Then the extracted chips are further treated as described in the block diagram in FIG. 1. For all three alkali sources it is shown that the extraction process will not significantly affect the final kraft pulp yield and pulp viscosity compared to that of the control, while about 6-8% of the wood is dissolved in the extraction process.

The effect of cooking time and effective alkali charge during kraft cooking after extraction of the chips with $Na_2CO_3$, $Na_2CO_3$ plus 0.05% AQ (on wood), or $NaBO_2$ to produce a near-neutral extract is described in Example 6. The results in FIG. 2 show that at the same kappa number the total pulp yield after extraction with $Na_2CO_3$ followed by kraft cooking is about 1 and 0.5% lower than that of the control kraft cook at 15% EA charge when using respectively 13 and 12% EA charge during cooking after the extraction. The results in FIG. 3 show that at the same kappa number the total pulp yield after extraction with $NaBO_2$ followed by kraft cooking at 12% EA charge is about 0 to 0.5% lower than that of the control kraft cook at 15% EA charge. Finally FIG. 4 shows that at the same kappa number the total pulp yield after extraction with $Na_2CO_3$ plus 0.05% AQ followed by kraft cooking at 12% EA charge is about 1% higher than that of the control kraft cook at 15% EA charge. Since the adsorption treatment may further increase the final pulp yield (on wood) by about 0.5 to 1%, this means that for the three extractions procedures (i.e. $Na_2CO_3$, $Na_2CO_3$ plus 0.05% AQ (on wood), or $NaBO_2$ to produce a near-neutral extract) following the scheme shown in FIG. 1 produces a pulp with the same or higher total yield than that of the control kraft cook alone. Another important technical improvement of these extraction/cooking schemes is that the EA during cooking can be reduced with 3% to 12% compared to the control at 15% EA. This can also confirmed by the results in FIG. 5 which shows that the kraft cooks performed at 12% EA after extraction with $Na_2CO_3$ or $Na_2CO_3$ plus 0.05% AQ produce the same residual effective alkali (REA) content in the black liquor at the same kappa number as that of the control kraft cook at 15% EA. This figure also shows that the REA in the black liquor after extraction with $NaBO_2$ is approximately 1% lower than that of the control. Finally FIG. 7 shows that the delignification rate is higher for the kraft cooks performed at 12% EA after extraction with $Na_2CO_3$ compared to the kraft control cook. This means that the time at the cooking temperature to obtain the desired kappa number may be reduced compared to that of the control. The opposite is true for a kraft cook following extraction by $NaBO_2$. The latter may be explained by the lower REA in the black liquor, and thus it is required to increase the EA charge during kraft cooking from 12 to 13% when it follows an extraction using $NaBO_2$. However it should be pointed out that for each mole of $NaBO_2$ there will also be two moles of NaOH produced if it is processed in the alkaline recovery process.

Example 1

Control Cooking Experiments

Kraft Pulping Conditions: Wood chips: Mixed southern hardwood. Effective Alkali: 15%. Sulfidity: 30% (on AA). Liquid to Wood Ratio: 4.5. Cooking Temperature: 160° C. H-factor: 1500 hrs.

Results (average of 4 duplicate cooks): Screened Yield: 46.50%, Reject: 0.072%; Total Yield: 46.57%. Kappa Number: 16.0. Viscosity: 40.6 (c.p.).

Comment: Carbohydrate analysis show that this wood mixture has a relatively high lignin content, and thus it was relatively hard to cook and resulted in a relatively low yield.

Example 2

Pure Water
Pre-Extraction/Cooking/Washing/Adsorption
Experiments

Water Extraction Conditions: No chemicals were added. Liquid to Wood Ratio: 4.5. Extraction Temperature: 100° C., 125° C., 130° C., 140° C., 150° C., 160° C. Extraction Time: 15 minutes; 45 minutes; 90 minutes.

Water Extraction Results: Pure water extraction leads to the removal of about 4~12% of wood substance from Southern Mixed Hardwood chips, with the removal increasing with extraction temperature at 90 minutes extraction time. The pH of the final extraction liquid decreases with increasing extraction temperature from a pH of 4.4 at 130° C. to 3.56 at 160° C. Sugar analysis shown that for pure water extraction the yield loss after cooking is mostly due to xylan loss. GPC analysis shows that the degree of polymerization of the extracted sugars is relatively small. When the extraction temperature reaches or exceeds 140° C., the wood substance removal increases significantly.

Kraft Pulping Conditions: Effective Alkali: 12~15%. Sulfidity: 30% (AA). Liquid to Wood Ratio: 4.5. Cooking Temperature: 160° C. H-factor: 1500 hrs.

Kraft Pulping Results: Screened Yield: 38.55~47.48% (with the yield decreasing with increasing water extraction temperature). Reject: 0.013~0.29%. Total Yield: 38.71~47.90%. Kappa Number: 16.0~20.0 (depending on EA level). Viscosity: 37.7~98.0 (c.p.). About 2, 5.5 and 8% lower pulp yield compared to control cook when the water extraction temperature is 140, 150 and 160° C. respectively. The viscosities of the pulps obtained with water extraction are much higher than that of the control.

Comment: With pure water extraction, it is not possible to extract a significant amount of hemicelluloses without causing a sizable loss in yield for the final kraft pulp.

Adsorption Conditions: Temperature: 60~90° C. Time: 30~60 minute. Consistency: 4~10%. The optimal adsorption conditions appear to be 60 minutes at 60 to 90° C.

Adsorption Results: The pulp yield for at optimal adsorption conditions is about 1~2% higher than that of the control. The pulp yield gain increases with the dissolved solid content of the extraction solution.

Example 3

NaOH Pre-Extraction/Cooking/Washing/Adsorption
Experiments

NaOH Pre-Extraction Conditions: 3% NaOH (as $Na_2O$) was added. Liquid to Wood Ratio: 4.5. Extraction Temperature: 130° C., 140° C., 150° C., 160° C. Extraction Time: 90 minutes.

NaOH Extraction Results: The extraction at 130 to 150° C. leads to the removal of about 8% of wood substance from Southern Mixed Hardwood chips. Residual solid content in the extraction liquor increases slightly with increasing extraction temperature. pH value in the extraction liquid decreased with the increase of extraction temperature but remained close to neutral (8.2 to 6.1). The sugar analysis shows that the yield loss after alkaline extraction and cooking is due both to cellulose and xylan loss. GPC analysis data shows that the molecular weight of the extracted wood sugars is larger than when extracting with pure water (higher DP).

Kraft Pulping Conditions: Effective Alkali: 12~15%. Sulfidity: 30% (AA). Liquid to Wood Ratio: 4.5. Cooking Temperature: 160° C. H-factor: 1500 hrs.

Kraft Pulping Results: Screened Yield: 44.92~46.03% (depending on the extraction temperature). Reject: 0.01~0.535%. Total Yield: 45.46~45.95%. Kappa Number: 14.7~20.7 (depending on EA level). Viscosity: 32.9~52.7 (c.p.). The final total pulp yield is only about 1% lower than the control cook (46.5% without extraction). Use of 10% NaOH (on od wood) in the water extraction also gives a significantly lower pulp yield, similar to that obtained with pure water extraction.

Adsorption Conditions: Temperature: 60~90° C. Time: 30~60 minutes. Consistency: 4~10%. The optimal adsorption conditions appear to be 60 minutes at 60 to 90° C.

Results: The pulp yield for this experiment is about 1~2% higher than that of the control. The pulp yield improvement depends on the solid content in the adsorption liquid. Without controlling the pH, the treatment also increases the kappa number by almost one unit, some lignin must be co-adsorbed.

Comment: When the extraction is performed with NaOH to produce a final neutral solution, the extraction process will not significantly affect the overall kraft pulp yield and pulp viscosity compared to that of the control.

Example 4

Na$_2$CO$_3$ Pre-Extraction/Cooking/Washing Experiment

Na$_2$CO$_3$ Extraction Conditions: 3% Na$_2$CO$_3$ (as Na$_2$O) was added. Liquid to Wood Ratio: 4.5. Extraction Temperature: 140° C. Extraction Time: 90 minutes.

Na$_2$CO$_3$ Extraction Results: Extraction leads to the removal of about 8% of wood substance from a new supply of Southern Mixed Hardwood chips. The dissolved solids content in the extraction liquor decreases compared to NaOH extraction in Example 3 at 140° C. (2.15 compared to 2.46%). The pH of the extraction liquid is close to neutral. The sugar analysis shows that a relatively large amount of cellulose, lignin, and hemicellulose are extracted from the wood chips.

Kraft Pulping Conditions: Effective Alkali: 13~15%. Sulfidity: 30% (AA). Liquid to Wood Ratio: 4.5. Cooking Temperature: 160° C. H-factor: 1500 hrs.

Kraft Pulping Results: About 1% (at 13% EA) to 2% (at 15% EA) lower kraft pulp yield compared to the control cook performed on the new supply of Southern Mixed Hardwood chips. The pulp viscosity is similar to that of the control.

Comment: When the extraction is performed with Na$_2$CO$_3$, the pulp yield and viscosity are similar to that of the control, while the EA charge in the kraft process may be reduced compared to the control.

Example 5

NaBO2 Pre-Extraction/Cooking/Washing/Adsorption Experiments

NaBO$_2$ Extraction Conditions: 4~5% NaBO$_2$ (as Na$_2$O) was added. Liquid to Wood Ratio: 4.5. Extraction Temperature: 140° C. Extraction Time: 90 minutes.

NaBO$_2$ Extraction Results: Adding only 4% NaBO$_2$ (as Na$_2$O, on od wood) leads to the removal of about 6% of wood substance from Southern Mixed Hardwood chips. pH value in the extraction liquid close to neutral. The sugar analysis shows that a relatively small amount of glucan, mannan and lignin, but a relatively large amount of xylan was extracted from the wood chips. The NaBO$_2$ extraction preserves more cellulose in the wood than NaOH or Na$_2$CO$_3$ extraction.

Kraft Pulping Conditions: Effective Alkali: 13.5%. Sulfidity: 30% (AA). Liquid to Wood Ratio: 4.5. Cooking Temperature: 160° C. H-factor: 1500 hrs.

Kraft Pulping Results: Screened Yield: 46.01% (depending on the extraction temperature). Reject: 0.045%. Total Yield: 46.06%. Kappa Number: 18.5. About 1% lower kraft pulp yield compared to control cook.

Adsorption Conditions: Temperature: 90° C. Time: 60 minutes. Consistency: 10%.

Adsorption Results: The pulp yield for this experiment is about 1% higher than that of the control. The kappa number changes after adsorption depending on the final pH. A high pH does not increase the kappa number. If adsorption process is performed without controlling the pH, then the kappa number increases by almost one unit.

Comment: When performing the extraction with NaBO$_2$, the extraction process will not significantly affect the final kraft pulp yield and pulp viscosity compare to that of the control.

Example 6

Effect of Cooking Time and Effective Alkali Charge During Kraft Cooking After Extraction of the Chips with Na2CO3, Na2CO3 Plus 0.05% AQ (on Wood), or NaBO2 to Produce a Near-Neutral Extract The kraft cooking conditions for the control without pre-extraction (called KP-x), after pre-extraction with 3% (as Na$_2$O on wood) of Na$_2$CO$_3$ (called 3CX-x), after pre-extraction with 4% (as Na$_2$O on wood) of NaBO$_2$ (called 4BX-x), and after pre-extraction with 3% (as Na$_2$O on wood) of Na$_2$CO$_3$ plus 0.05% AQ (called 3CQ-xB) are shown below in Table 1.

TABLE 1

Extraction-Kraft Cooking Experiments for Southern Mixed Hardwoods

| RUN | Total Yield (%) | Screened Yield (%) | Screen Reject (%) | Kappa Number | H-factor | Time (minute) @ 160° C. | EA (%) | REA (g/L) |
|---|---|---|---|---|---|---|---|---|
| KP-1 | 48.82 | 48.75 | 0.06 | 18.8 | 1500 | 3:26 | 15 | 3.86 |
| KP-2 | 48.46 | 48.42 | 0.04 | 17.5 | 1510 | 3:26 | 15 | 2.69 |
| KP-3 | 48.69 | 48.64 | 0.05 | 17.80 | 1560 | 4:00 | 15 | — |
| KP-4 | 48.01 | 47.93 | 0.08 | 17.96 | 1210 | 3:00 | 15 | 2.91 |
| KP-5 | 49.27 | 48.95 | 0.32 | 20.92 | 833 | 2:00 | 15 | 4.31 |
| KP-6 | 47.55 | 47.50 | 0.05 | 16.41 | 1650 | 3:40 | 15 | 2.76 |
| KP-7 | 48.80 | 47.46 | 1.34 | 21.44 | 689 | 1:40 | 15 | 4.53 |
| 3CX-1 | 44.70 | 44.64 | 0.06 | 12.55 | 1500 | 3:26 | 15 | 5.65 |
| 3CX-2 | 48.42 | 48.40 | 0.02 | 15.94 | 1380 | 3:26 | 13 | 2.98 |
| 3CX-3 | 46.43 | 46.40 | 0.03 | 16.26 | 884 | 3:00 | 13 | 5.70 |
| 3CX-4 | 47.72 | 47.56 | 0.17 | 18.76 | 435 | 2:00 | 13 | 4.57 |
| 3CX-5 | 47.39 | 47.36 | 0.04 | 17.41 | 957 | 2:20 | 13 | 4.23 |
| 3CX-6 | 48.04 | 47.82 | 0.22 | 20.92 | 689 | 1:40 | 13 | 5.34 |
| 3CX-7 | 46.96 | 46.83 | 0.13 | 15.71 | 1420 | 3:30 | 13 | 3.17 |
| 3CX-8 | 48.20 | 48.03 | 0.17 | 20.31 | 925 | 2:00 | 12 | 3.49 |
| 3CX-9 | 47.35 | 47.30 | 0.05 | 16.87 | 1191 | 2:40 | 12 | 2.49 |
| 3CX-10 | 48.16 | 48.09 | 0.07 | 16.34 | 1392 | 3:10 | 12 | 2.39 |
| 3CX-11 | 46.98 | 46.93 | 0.05 | 16.99 | 1490 | 3:40 | 12 | 3.05 |
| 3CX-12 | 48.63 | 48.52 | 0.11 | 19.48 | 1042 | 2:18 | 12 | 3.45 |

TABLE 1-continued

Extraction-Kraft Cooking Experiments for Southern Mixed Hardwoods

| RUN | Total Yield (%) | Screened Yield (%) | Screen Reject (%) | Kappa Number | H-factor | Time (minute) @ 160° C. | EA (%) | REA (g/L) |
|---|---|---|---|---|---|---|---|---|
| 3CX-13 | 48.08 | 47.98 | 0.09 | 17.51 | 1633 | 3:40 | 12 | 2.27 |
| 4BX-1 | 48.73 | 48.41 | 0.32 | 21.66 | 825 | 2:00 | 12 | 2.91 |
| 4BX-2 | 48.39 | 47.95 | 0.45 | 20.67 | 965 | 2:21 | 12 | 2.46 |
| 4BX-3 | 47.85 | 47.80 | 0.06 | 17.90 | 2044 | 5:00 | 12 | 1.26 |
| 4BX-4 | 48.56 | 48.56 | 0.10 | 18.27 | 1500 | 3:32 | 12 | 1.80 |
| 4BX-5 | 48.75 | 48.67 | 0.08 | 19.80 | 1460 | 3:36 | 12 | 2.39 |
| 4BX-6 | 46.29 | 46.27 | 0.02 | 16.08 | 3010 | 6:30 | 12 | 0.85 |
| 3CQ-1B | 48.58 | 48.36 | 0.21 | 16.32 | 1220 | 3:00 | 12 | 2.76 |
| 3CQ-2B | 48.94 | 48.72 | 0.21 | 18.14 | 720 | 1:41 | 12 | 3.35 |
| 3CQ-3B | 49.47 | 49.36 | 0.11 | 19.82 | 943 | 2:18 | 12 | 3.67 |
| 3CQ-4B | 49.60 | 49.51 | 0.09 | 18.43 | 1420 | 3:31 | 12 | 2.29 |

As in Examples 4 and 5, the extraction time and temperature in all pre-extractions in this example are 90 minutes and 140° C. respectively. The liquor-to-wood ratio in both the pre-extraction and the kraft cook are 4.5 L/kg od. wood. After pre-extraction the liquor is drained from the chips (about ⅔ of the total present), and 30% sulfidity white liquor plus fresh water is added to obtain a liquor-to-wood ratio of 4.5 L/kg at the required effective alkali charge. The cooking time for both the kraft control and pre-extraction cooks was varied from 100 minutes to 240 minutes at the maximum cooking temperature of 160° C. Total pulp yields, screened yields, reject contents, kappa number, and residual effective alkali concentration were measured from the pulp samples obtained from each cook.

The total yield for all experiments are displayed in FIG. 2. The results show that the total pulp yield versus kappa number relationship for the extraction/kraft cooks runs parallel to that of the kraft control cooks over the range of bleachable pulp kappa numbers. At the same kappa number the total pulp yield after extraction with $Na_2CO_3$ followed by kraft cooking is about 1 and 0.5% lower than that of the control kraft cook at 15% EA charge when using respectively 13 and 12% EA charge during cooking after the extraction. The results in FIG. 3 show the effect of effective alkali charge during the kraft cook on the total yield for the $Na_2CO_3$ pre-extraction cooks as compared to that of the control kraft cook at 15% EA charge. It clearly shows the increase in yield for these pre-extraction cooks when the EA charge is reduced from 15 to 12%. FIG. 4 shows that at the same kappa number the total pulp yield after pre-extraction with 4% $NaBO_2$ followed by kraft cooking at 12% EA charge is about 0 to 0.5% lower than that of the control kraft cook at 15% EA charge. Finally FIG. 5 shows that at the same kappa number the total pulp yield after extraction with $Na_2CO_3$ plus 0.05% AQ followed by kraft cooking at 12% EA charge is almost 1% higher than that of the control kraft cook at 15% EA charge. The residual lignin content of the pulps (in % based on od wood) was determined by multiplication of the kappa number by 0.148 times the total yield (as fraction). The linear semi-logarithmic plots in FIG. 2 of the lignin content (based on wood) versus cooking time indicate first order delignification kinetics, with the slope being the delignification rate constant. The results in FIG. 6 show that the delignification rate for the $Na_2CO_3$ pre-extraction/kraft cooks is higher than that of control kraft cook, while that of the $NaBO_2$ pre-extraction/kraft cook is lower than that of the control kraft cook. The results of the $Na_2CO_3$ plus 0.05% AQ pre-extraction/kraft cooks display too much scatter to make a conclusion regarding the relative delignification rate. The effect of the EA charge during the kraft cook of the $Na_2CO_3$ pre-extraction/kraft cooks is seen more clearly in FIG. 7. It shows that at 12 and 13% EA charge during the kraft cook of the $Na_2CO_3$ pre-extraction/kraft cooks, the delignification rate is respectively about 30 and 40% higher than that of the control kraft cook. The slower delignification rate of the $NaBO_2$ pre-extraction/kraft cook relative to the control is shown separately in FIG. 8. The effect of these delignification rates on the development of the Kappa number versus H-factor are shown in FIG. 9. It shows that the $Na_2CO_3$ pre-extraction/kraft cooks reach a certain Kappa in a shorter time at the cooking temperature. It shows that at the same H-factor the kappa numbers of the $Na_2CO_3$ extraction/kraft cooks at 13% effective alkali charge are about 3-5 lower units lower than those of kraft control cooks at 15% effective alkali charge. Alternatively, at the same kappa number the H-factor can be reduced by about a factor 2 for the $Na_2CO_3$ extraction/kraft cooks at 13% effective alkali charge compared to the kraft control cooks at 15% effective alkali charge. The reduction in H-factor compared to the kraft control cook are very small for the $Na_2CO_3$ extraction/kraft cooks at 12% effective alkali charge.

The residual effective alkali concentration in the black liquor samples was determined following the IP method. FIG. 10 shows that the $Na_2CO_3$ extraction/kraft cooks at 13% EA charge produce a black liquor of approximately 0.5% higher REA than that of the kraft controls with 15% EA charge at the same final kappa number, while there is very little difference in REA between the control kraft cook and the $Na_2CO_3$ extraction/kraft cook at 12% EA. This result indicates that the hardwood chips pre-extracted with a charge of 3% $Na_2CO_3$ (as $Na_2O$) consume about 3% less effective alkali during the subsequent kraft cook compared to a control kraft cook. The percentage of screen rejects versus kappa number for the $Na_2CO_3$ and $NaBO_2$ pre-extraction/kraft cooks is shown in FIG. 11. Compared to the control it can be seen that the pre-extraction cooks give less rejects at the higher range of kappa numbers.

Experiments Relating to Improved Delignification Selectivity

1. Wood Extract Preparation

Black Spruce wood meal was produced in the Wiley mill. The fraction passing through a 20 mesh screen and retained on a 40 mesh screen was used for experimentation.

100 g (oven dry basis) of the wood meal sieve fraction was mixed with 800 ml 10% NaOH and kept at 60° C. for 12 hours. Then the extract was removed from the wood meal by filtration. The wood solution contained 1.51% NaOH (determined by titration) and 3.02 other solids (determined by gravimetry)

2. Oxygen Delignification

All oxygen delignification experiments were performed in a horizontally-placed stirred batch reactor of Parr filled with 30 grams (oven dry basis) kraft pulp at 10% consistency.

The pulp was a softwood kraft pulp obtained from International Paper at Jay, Me. with a kappa number of 28.0 and an intrinsic viscosity of 1172 ml/gram. 0.2% $MgSO_4$ (on o.d. pulp) and variable charges of NaOH and wood extracts were added to the pulp and the mixture was added to the Parr reactor.

Oxygen delignification of the pulp was performed at 100 psig oxygen pressure at 90° C. for 60 minutes. In total three experiments were performed with the addition of the wood extract, while another four trials without addition of wood extract served as control experiments. The variable experimental conditions pulp and liquor analysis are shown in Table 2 below. In experiment 3 the pulp was first mixed with the extract, and after about an hour the extract was removed by washing (two times at 1% consistency). Then $MgSO_4$ and NaOH were added to the washed pulp for subsequent oxygen delignification.

TABLE 2

Results of Oxygen Delignification Experiments

| Experiment | Extract addition (grams) | Washing after extract addition | NaOH addition (% on o.d. pulp) | Kappa $O_2$ delig. pulp | Intrinsic viscosity $O_2$ delig. Pulp (ml/g) | Pulp Yield (%) | Residual alkalinity (g NaOH/L) |
|---|---|---|---|---|---|---|---|
| 1 | 10 | No | 2.5 | 16.4 | 947 | 97.2 | 1.48 |
| 2 | 100 | No | 0 | 14.3 | 930 | 98.9 | 3.04 |
| 3 | 100 | Yes | 2.5 | 15.7 | 954 | 97.9 | 1.12 |
| Control 1 | n.a. | n.a. | 2.5 | 16.1 | 937 | 97.6 | 1.56 |
| Control 2 | n.a. | n.a. | 2.5 | 15.9 | 928 | 97.5 | 1.60 |
| Control 3 | n.a. | n.a. | 3.0 | 15.5 | 912 | 97.0 | 1.40 |
| Control 4 | n.a. | n.a. | 4.5 | 13.8 | 849 | 96.7 | 3.35 |

3. Evaluation of the Results

Because the extract contains alkali, the experiments should be compared at the same final alkalinity of the liquor. Thus by comparison of experiment 1 with controls 1, 2 and 3 it can be seen that at a low addition of 10 ml of extract (or about 1.0% charge of extract solids on pulp) there is no significant improvement in viscosity at the same kappa number. Comparison of experiment 2 with Control 4 (with similar residual alkalinity) shows a significant viscosity improvement (estimated at 50-60 ml/g at the same final kappa) and a pulp yield improvement of about 2%. Comparison of experiment 3 with control experiments 1, 2 and 3 showed that viscosity was still improved but not the yield.

In accordance with the provisions of the patent statutes, the principle and mode of operation of this invention have been described in its preferred embodiments. However, it must be understood that this invention may be practiced otherwise than as specifically described without departing from its spirit or scope.

What is claimed is:

1. A process of treating a lignocellulosic material comprising:

in a pre-extraction step, extracting hemicellulose from the lignocellulosic material, by contacting the lignocellulosic material with an aqueous solution including a basic material in water, the temperature of extraction being within a range of from about 130° C. to about 180° C., the aqueous solution at the end of the pre-extraction step having a pH within a range of from about 4.5 to about 9.5 measured at a temperature of 20° C. and the pre-extraction step extracting at least about 15% of the hemicellulose from the lignocellulosic material by dry weight; then in a pulping step, separating the lignocellulosic material into pulp; and then in an adsorption step, adsorbing the extracted hemicellulose on the pulp while controlling the adsorption step pH from about 9 to about 14, recovering a sugar rich extract not adsorbed in the adsorption step and producing value-added materials from said sugar rich extract.

2. The process of claim 1 wherein the pre-extraction conditions release acidic material from the lignocellulosic material into the aqueous solution.

3. The process of claim 2 wherein the conditions of the pre-extraction step include a time of extraction within a range of from about 15 minutes to about 150 minutes.

4. The process of claim 1 wherein the pulp yield at the end of the adsorption step is higher than the pulp yield of a process which includes the same pulping step without the pre-extraction and adsorption steps.

5. The process of claim 1 wherein the pulping step comprises a chemical pulping process in which the lignocellulosic material is cooked in a pulping liquor, and wherein the cooking time is reduced compared to a process which includes the same pulping step without the pre-extraction step.

6. The process of claim 1 wherein the pulping step comprises a chemical pulping process in which the lignocellulosic material is cooked in a pulping liquor containing an alkali material, and wherein the effective alkali charge is reduced compared to a process which includes the same pulping step without the pre-extraction step.

7. The process of claim 1 wherein the basic material in water is sodium carbonate.

8. The process of claim 1 which further comprises, at any time in relation to the adsorption step, subjecting the pulp to at least one of delignification and bleaching to lighten the color of the pulp.

9. The process of claim 1 wherein the lignocellulosic material is wood.

10. The process of claim 1 wherein the aqueous solution at the end of the hemicellulose pre-extraction step has a pH within a range of from about 6 to about 8 measured at a temperature of 20° C.

11. The process of claim 1 wherein one of anthraquinone, anthraquinone derivatives and mixtures thereof is contacted with the lignocellulosic material in the pre-extraction step.

12. The process of claim 1 wherein the aqueous solution further includes an additive that improves extraction.

13. The process of claim 1 wherein at least a part of the aqueous solution from the end of the pre-extraction step is recycled by adding it to the aqueous solution at the beginning of the pre-extraction step.

14. The process of claim 1 which produces a kraft pulp.

* * * * *